US008823771B2

(12) United States Patent  
Jeong et al.

(10) Patent No.: US 8,823,771 B2  
(45) Date of Patent: Sep. 2, 2014

(54) IMAGE PROCESSING APPARATUS AND METHOD

(75) Inventors: Young Ju Jeong, Seoul (KR); Young Shin Kwak, Suwon-si (KR); Young Ran Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1267 days.

(21) Appl. No.: 12/382,747

(22) Filed: Mar. 23, 2009

(65) Prior Publication Data

US 2010/0091092 A1    Apr. 15, 2010

(30) Foreign Application Priority Data

Oct. 10, 2008    (KR) .................. 10-2008-0099799

(51) Int. Cl.  
*H04N 15/00*    (2006.01)
(52) U.S. Cl.  
USPC .......................................................... 348/43
(58) Field of Classification Search  
USPC .......................................................... 348/43  
See application file for complete search history.

(56) References Cited

U.S. PATENT DOCUMENTS

| 6,593,925 | B1 * | 7/2003 | Hakura et al. ................ 345/426 |
| 7,142,600 | B1 * | 11/2006 | Schonfeld et al. ....... 375/240.16 |
| 7,512,262 | B2 * | 3/2009 | Criminisi et al. ............ 382/154 |
| 7,633,511 | B2 * | 12/2009 | Shum et al. ................... 345/628 |
| 7,889,947 | B2 * | 2/2011 | Ofek et al. .................... 382/294 |
| 8,009,899 | B2 * | 8/2011 | Chen et al. .................... 382/154 |
| RE42,790 | E * | 10/2011 | Schonfeld et al. ....... 375/240.16 |
| 2002/0061131 | A1 | 5/2002 | Sawhney et al. |
| 2003/0044045 | A1 * | 3/2003 | Schoepflin et al. ........... 382/103 |
| 2005/0219264 | A1 * | 10/2005 | Shum et al. ................... 345/629 |
| 2006/0066612 | A1 | 3/2006 | Yang et al. |
| 2006/0193509 | A1 * | 8/2006 | Criminisi et al. ............. 382/154 |
| 2009/0129667 | A1 * | 5/2009 | Ho et al. ....................... 382/154 |
| 2011/0261050 | A1 * | 10/2011 | Smolic et al. ................ 345/419 |

FOREIGN PATENT DOCUMENTS

| JP | 2003-505773 | 2/2003 |
| KR | 10-2005-0072139 | 7/2005 |
| KR | 10-2007-0042989 | 4/2007 |
| WO | 01/06462 A1 | 1/2001 |
| WO | 2004/044842 A2 | 5/2004 |
| WO | 2006/004932 A2 | 1/2006 |
| WO | 2007/042251 | 4/2007 |

OTHER PUBLICATIONS

Ma et al., "Automatic Video Object Segmentation Using Depth Information and an Active Contour Model", Centre for Communication Systems Research, University of Surrey, Guildford, Surrey, United Kingdom, Oct. 8, 2008, "http://ieeexplore.ieee.org/stamp/stamp.jsp?tp=&arnumber=4665204".*

Feldman et al., "Motion Segmentation and Depth Ordering Using an Occlusion Detector" IEEE Computer Society, Jul. 2008, "http://ieeexplore.ieee.org/stamp/stamp.jsp?tp=&arnumber=4359366".*

(Continued)

*Primary Examiner* — Jerry Dennison  
(74) *Attorney, Agent, or Firm* — Staas & Halsey LLP (57) ABSTRACT

An image processing apparatus is disclosed. A calculation unit may determine a disocclusion region of a first frame of a video. A processing unit may generate color information of the disocclusion region of the first frame using color information associated with a second frame of the video.

18 Claims, 10 Drawing Sheets

(56) References Cited

OTHER PUBLICATIONS

Wang et al., "Depth Image Segmentation for Improved Virtual View Image Quality in 3-DTV", Dec. 1, 2007, "http://ieeexplore.ieee.org/stamp/stamp.jsp?tp=&arnumber=4445883".*

Gong et al., "Camera Field Rendering", Alberta Canada, May 23, 2002.*

Gong, Yang, "Multi-resolution Genetic Algorithm and its Application in Motion Estimation", IEEE, 2002.*

Xu et al., "Object Representation using 1D Displacement Mapping", May 19, 2004.*

Atzpadin N. et al., "Stereo Analysis by Hybrid Recursive Matching for Real-Time Immersive Video Conferencing", IEEE Transactions on Circuits and Systems for Video Technology, IEEE Service Center, Piscataway, NJ, US. vol. 14, No. 3, Mar. 1, 2004, pp. 325-326.

William Mark, "Post-Rendering 3-D Image Warping", Apr. 21, 2009, University of North Carolina at chapel Hill, http://www.cs.unc.edu{ibr/pubs/mark-diss/TR99-022.pdf}, pp. 122-123.

Enhua Wu et al., "Composition of Novel Views through an Efficient Image Warping", The Visual Computer, vol. 19, No. 5, Feb. 14, 2003, http://springerlink.com/content/3x1D527rbagkmfv5/> pp. 325-326.

Kanade T. et al., "Virtualized Reality: Constructing Virtual Worlds from Real Scenes", IEEE Multimedia, IEEE Service Center, New York, NY, USA, vol. 4, No. 1, Jan. 1, 1997, p. 40.

European Search Report dated Jan. 7, 2010 and issued in corresponding European Patent Application 09171221.6.

Chinese Office Action mailed Jan. 28, 2013 in corresponding Chinese Patent Application No. 200910177614.6.

* cited by examiner

1st VIEW 1010

2nd VIEW 1020

4th VIEW 1030

5th VIEW 1040

8th VIEW 1050

9th VIEW 1060

IMAGE PROCESSING APPARATUS AND METHOD

CROSS-REFERENCE TO RELATED APPLICATIONS

This application claims the benefit of Korean Patent Application No. 10-2008-0099799, filed on Oct. 10, 2008, in the Korean Intellectual Property Office, the disclosure of which is incorporated herein by reference.

BACKGROUND

1. Field

Example embodiments relate to a virtual three-dimensional (3D) display, and more particularly, to an apparatus and method which stores color information of a disocclusion region based on a viewpoint in a multi-view display.

2. Description of the Related Art

A virtual three-dimensional (3D) display provides different images to left and right eyes of a human, and thereby may provide a 3D effect. Here, the different images may indicate images from different viewpoints. In a stereoscopic method, a virtual 3D display may provide two different images, that is, one image for a left eye and another image for a right eye. In a 3D multi-view, a plurality of images different from each other may be provided depending on a viewing angle with a display.

Also, inputted color information and depth information of a particular frame may be used to render a 3D multi-view image. In this instance, a disocclusion phenomenon is to be overcome. The depth information may include information about an object with a relatively significant disparity and information about a background with a relatively insignificant disparity. When rendering is performed at a plurality of viewpoints for the 3D multi-view, a disocclusion region having no color information may be generated in a region having a large viewing angle.

A technology to overcome a disocclusion region is required due to the development of a multi-view display.

SUMMARY

Example embodiments may provide an image processing apparatus and method which effectively predicts a disocclusion region and generates color information.

Example embodiments may also provide an image processing apparatus and method which efficiently obtains color information of a disocclusion region from color information of at least one frame of a video.

According to example embodiments, there may be provided an image processing apparatus, including a calculation unit to determine a disocclusion region of a first frame of a video, and a processing unit to generate color information of the disocclusion region of the first frame using color information associated with a second frame of the video.

The calculation unit may determine the disocclusion region of the first frame based on a difference between a disparity of a background area of the first frame and a disparity of an object area of the first frame. In this instance, the disparities may be calculated using depth information associated with the first frame.

The calculation unit may determine a boundary between the object area and the background area of the first frame, and determine a band with a first width around the boundary as the disocclusion region of the first frame. In this instance, the first width may be in proportion to the difference between the disparity of the background area of the first frame and the disparity of the object area of the first frame.

At least one of the disparity of the background area of the first frame and the disparity of the object area of the first frame may be calculated between a viewpoint having a maximum viewing angle and a viewpoint having a minimum viewing angle from among a plurality of viewpoints associated with a multi-view image to be rendered based on the first frame.

The processing unit may determine a first block around the disocclusion region of the first frame, determine a first characteristic value of an area corresponding to the first block within at least one frame of the video, and determine the second frame based on the first characteristic value.

The processing unit may determine, as candidate frames of the second frame, a frame where the first characteristic value is less than a first threshold value from among the at least one frame of the video, generate color information of the disocclusion region around the first block with respect to the candidate frames of the second frame, and determine a frame which generates the greatest amount of color information of the disocclusion region around the first block, as the second frame. The processing unit may compare the first characteristic value of each of the candidate frames of the second frame to determine the second frame.

The processing unit may obtain color information associated with pixels having a depth value difference with pixels of the background area of the first frame from among pixels around the area corresponding to the first block within the candidate frames of the second frame, determine the color information of the disocclusion region around the first block, and determine the frame which generates the greatest amount of color information of the disocclusion region around the first block, as the second frame. In this instance, the depth value difference may be less than a second threshold value.

The processing unit may copy color information of an area around the area corresponding to the first block within the second frame to generate the color information of the disocclusion region of the first frame. In this instance, the processing unit may copy the color information of the area around the area corresponding to the first block within the second frame, change a location of the first block in the first frame, and copy color information of an area around an area corresponding to the changed first block within the second frame to generate the color information of the disocclusion region of the first frame.

The image processing apparatus may further include a rendering unit to render a multi-view image based on color information associated with the first frame, depth information associated with the first frame, the color information of the disocclusion region of the first frame.

According to example embodiments, there may be provided an image processing apparatus, including a calculation unit to determine a disocclusion region of a first frame of a video, and a processing unit to generate color information of the disocclusion region of the first frame using any one of color information associated with a second frame of the video and color information associated with the first frame of the video.

According to example embodiments, there may be provided an image processing method, including, determining a disocclusion region of a first frame of a video, and generating color information of the disocclusion region of the first frame using color information associated with a second frame of the video.

The generating may determine a first block around the disocclusion region of the first frame, determine a first characteristic value of an area corresponding to the first block within at least one frame of the video, and determine the second frame based on the first characteristic value.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, and advantages of example embodiments will become apparent and more readily appreciated from the following description, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
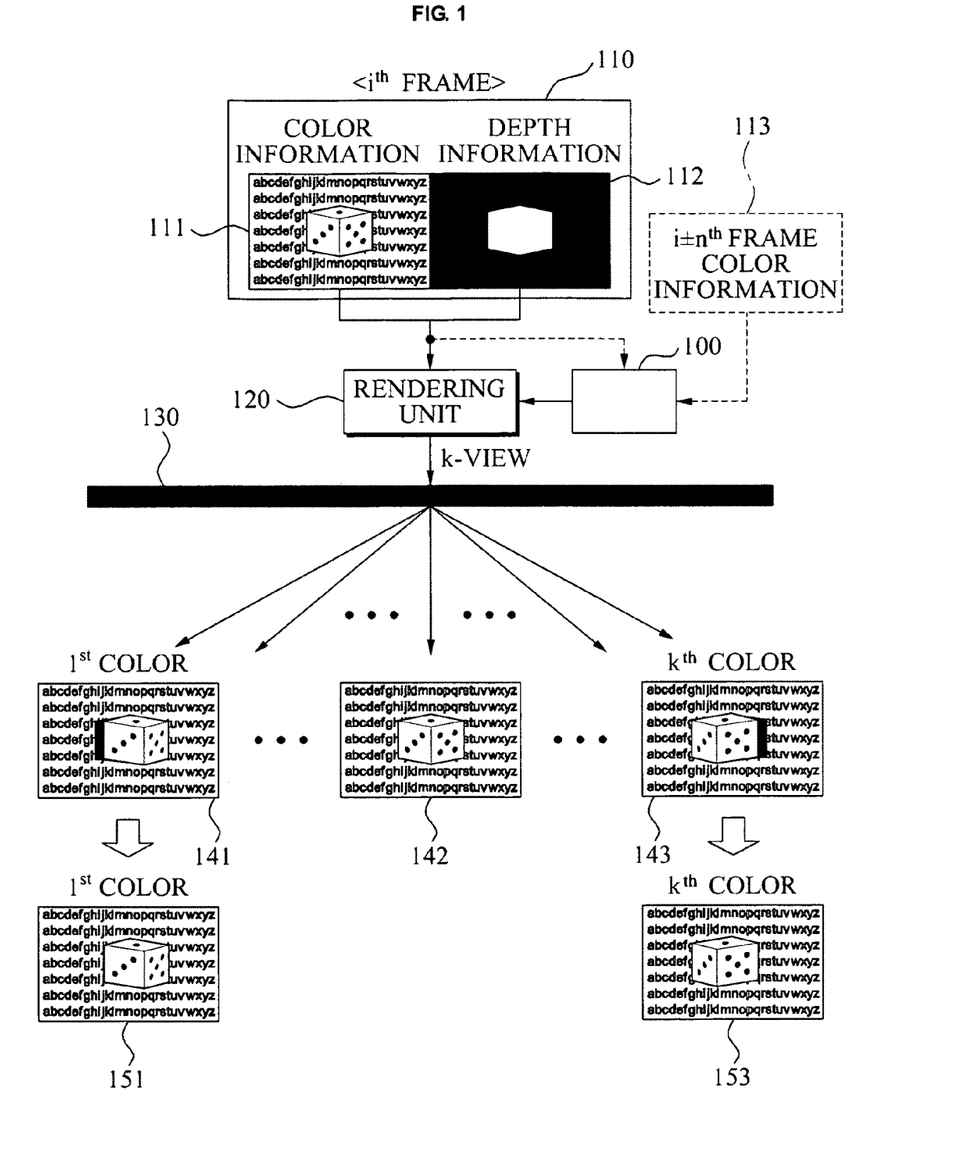
FIG. 1 illustrates a conceptual diagram of an image processing apparatus according to example embodiments.

FIG. 1 illustrates an image processing apparatus 100 according to example embodiments.

A frame 110 is an $i^{th}$ frame of a video for three-dimensional (3D) rendering. Here, i may be a natural number, and a plurality of frames may be provided through the video. The image processing apparatus 100 may generate color information of a disocclusion region of the frame 110. Hereinafter, the frame 110 is referred to as a first frame 110.

Color information 111 may indicate a color value such as a Red, Green and Blue (RGB) value, associated with the first frame 110. Depth information 112 may include a depth value of pixels associated with the first frame 110. A rendering unit 120 may match the depth information 112 with the color information 111.

A multi-view screen (or a display panel) 130 may provide different images to a plurality of viewpoints by refracting multi-view images provided from the rendering unit 120. The multi-view screen 130 may include a lenticular lens.

An image 141 may be observed at a first viewpoint. The first viewpoint may have a maximum viewing angle from among the plurality of viewpoints in a leftmost side.

An image 142 may be observed at a viewpoint having a minimum viewing angle with the multi-view screen 130 from among the plurality of viewpoints. Accordingly, the image 142 may be in an orthogonal direction to the multi-view screen 130.

An image 143 may be observed at a $k^{th}$ viewpoint. The $k^{th}$ viewpoint may have a maximum viewing angle from among the plurality of viewpoints in a rightmost side. k may be associated with a specification of the multi-view screen 130, and be a total number of the plurality of viewpoints. For example, when the multi-view screen 130 has nine-view characteristics, k may be nine.

However, a first disocclusion region which is rendered as black may be shown in the image 141. The first disocclusion region may be generated since color information of a portion of a background does not exist in a left side of a die which is an object.

A second disocclusion region which is rendered as black may be shown in the image 143. The second disocclusion region may be generated since color information of a portion of the background does not exist in a right side of the object. A disocclusion region is not shown in the image 142.

When k multi-view images are provided and two images neighboring each other are provided to both eyes of an observer, k−1 3D images may be provided. In this instance, the k−1 3D images may be different from each other. Also, a left image of the two images may be provided to a left eye and a right image of the two images may be provided to a right eye. Accordingly, the observer may recognize the object as a 3D object, and experience an effect as though the observer looks around the object may be obtained.

According to example embodiments, the image processing apparatus 100 may be provided with the color information 111 and the depth information 112 of the first frame 110, and color information of frames excluding the first frame 110, and thereby may generate color information of the disocclusion region of the first frame 110, and provide the color information to the rendering unit 120.

According to example embodiments, the image processing apparatus 100 may generate the color information of the disocclusion region of the first frame 110 based on color information of a second frame from among the frames excluding the first frame 110. However, the image processing apparatus 100 may not be limited to the above-described embodiment, and may also generate a portion of the color information of the disocclusion region of the first frame 110 based on the color information 111 of the first frame 110.

The rendering unit 120 may generate k (multi-view) images using the color information 111 and the depth information 112 of the first frame 110, and the color information of the disocclusion region of the first frame 110.

An image 151 generated by the image processing apparatus 100 may be provided to the first viewpoint. The image 151 may correspond to the image 141, and have color information of the first disocclusion region of the image 141.

An image 153 generated by the image processing apparatus 100 may be provided to the $k^{th}$ viewpoint. The image 153 may correspond to the image 143, and may have color information corresponding to the second disocclusion region of the image 143.

The image processing apparatus 100 and method is described in greater detail with reference to FIG. 2 through FIG. 10.

Figure 2:
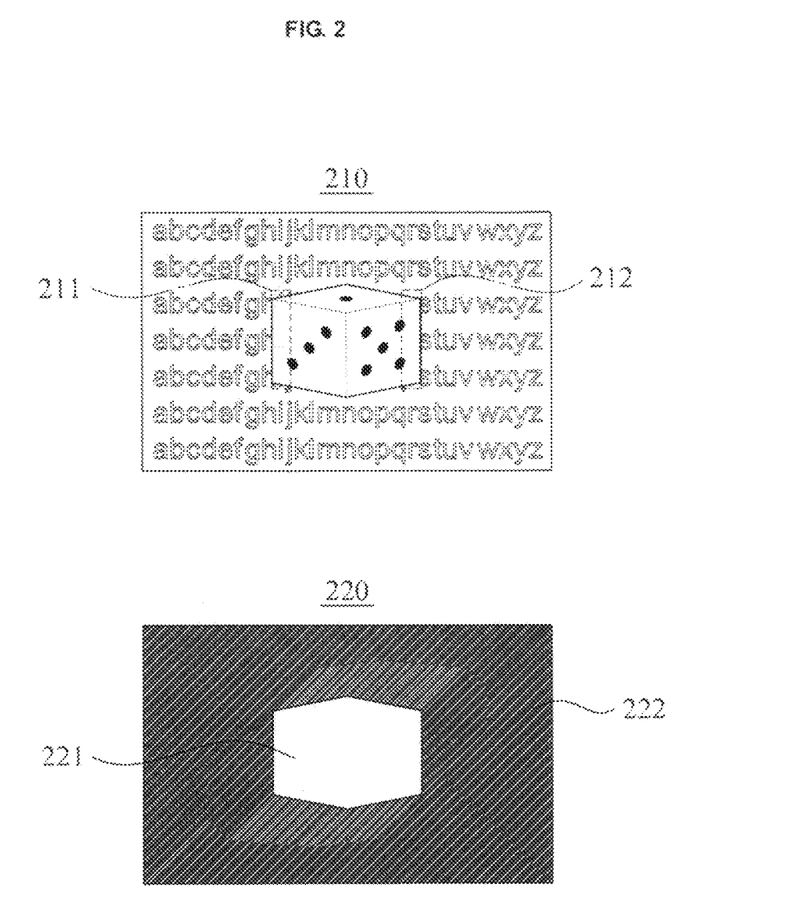
FIG. 2 illustrates color information and depth information of a first frame according to example embodiments.

FIG. 2 illustrates color information and depth information of a first frame according to example embodiments.

Color information 210 may correspond to the color information 111 of FIG. 1. A region 211 may correspond to the disocclusion region of the image 141. The region 211 may be occluded by the object at a viewpoint of FIG. 2. Also, a region 212 may correspond to the disocclusion region of the image 143. Although the region 212 may be occluded by the object at the viewpoint of FIG. 2, the region 212 may be shown depending on a viewpoint where rendering is performed. Accordingly, the region 212 requires color information.

Depth information 220 may indicate a distance from the multi-view screen 130. An object area 221 may have a great depth value, and thus the object area 221 is bright. A background area 222 may have a small depth value, and thus the background area 222 is dark. The depth values are included in the depth information 220. Although the depth information 220 is simply illustrated for convenience of description, the depth information 220 may generally include a number of levels (or a gradient).

Figure 3:
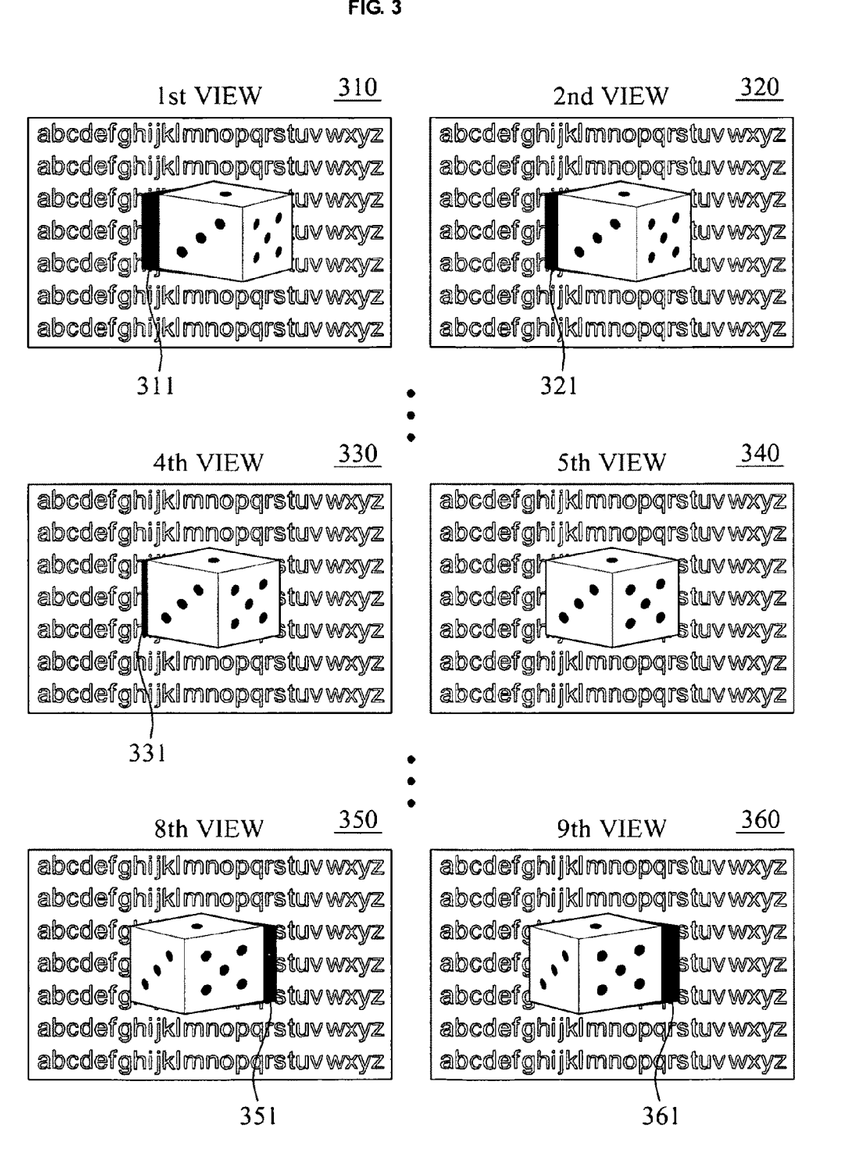
FIG. 3 illustrates disocclusion regions to be restored by an image processing apparatus according to example embodiments.

FIG. 3 illustrates disocclusion regions to be restored by an image processing apparatus according to example embodiments.

An image 310 may correspond to the image 141 of FIG. 1. As described above, when comparing to other images 320, 330, 340, 350, and 360, the image 310 may have a disocclusion region 311 with a greatest size in a left side of the object. An image 320 may correspond to the image provided at a second viewpoint, wherein the second viewpoint may be one of the multiple viewpoints illustrated in FIG. 1. The second viewpoint may have a large viewing angle in a second left side of the object. The image 320 may have a disocclusion region 321 smaller than the disocclusion region 311 of the image 310. Similarly, an image 330 may correspond to a fourth viewpoint, wherein the fourth viewpoint may be one of the multiple viewpoints in FIG. 1, and have a disocclusion region 331 smaller than the disocclusion region 321.

Also, when the total number of views k, is nine, and when a viewing angle is the smallest, an image 340 may correspond to the image 142 of FIG. 1, and a disocclusion region is not generated in the image 340.

When a viewpoint moves to the left side of the object, an image 350 and then another image 360 may be observed. A disocclusion region 351 exists in a right side of the object in the image 350, and a disocclusion region 361 with a maximum size exists in the right side of the object in the other image 360.

The image processing apparatus 100 may determine the disocclusion region 311 and the disocclusion region 361, and generate color information.

Figure 4:
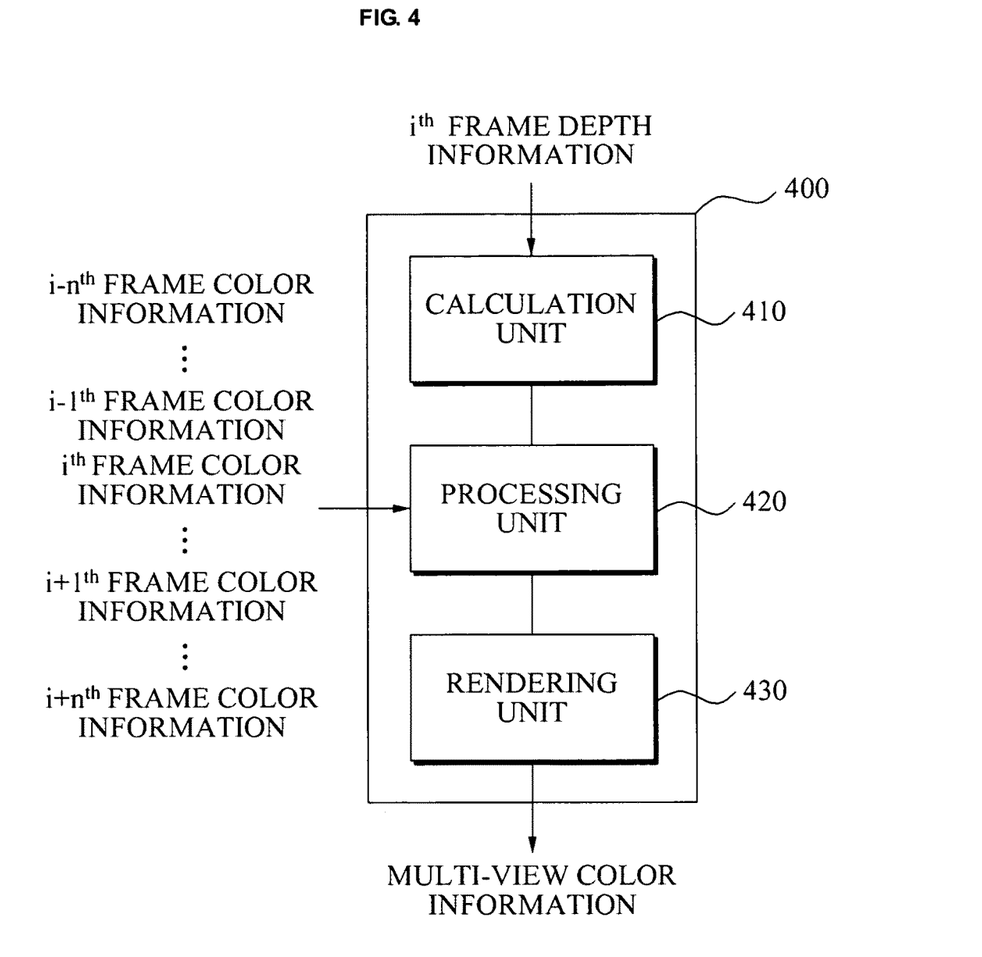
FIG. 4 illustrates an image processing apparatus according to example embodiments.

FIG. 4 illustrates an image processing apparatus 400 according to example embodiments.

A calculation unit 410 may calculate a difference between a disparity of an object area and a disparity of a background area at a plurality of viewpoints of a first frame, and thereby may determine a disocclusion region of the first frame.

According to example embodiments, the calculation unit 410 may receive depth information of the first frame. Also, the calculation unit 410 may determine a boundary between the object area and the background area based on a depth value of each area and/or a disparity. The depth value may be included in the depth information, and the disparity may be calculated at an arbitrary viewpoint. Also, the calculation unit 410 may determine the disocclusion region of the first frame around the boundary, which is described in greater detail with reference to FIG. 5.

A processing unit 420 may receive information about the disocclusion region of the first frame from the calculation unit 410, and determine a first block around the disocclusion region. The first block may be used to retrieve a reference frame for generating color information of a disocclusion region, for example, the disocclusion region 610 of FIG. 6.

The processing unit 420 may receive color information associated with a plurality of frames. Also, the processing unit 420 may retrieve an area corresponding to the first block in each of the plurality of frames. The area may be matched with the first block due to similar color values.

According to example embodiments, the processing unit 420 may calculate a first characteristic value. The first characteristic value may be a Sum of Squared Difference (SSD), and be calculated based on a color value of a predetermined block. As an SSD between predetermined areas of two frames decreases, the predetermined areas may approach a same color value.

Also, the processing unit 420 may compare the first characteristic value of each of the plurality of frames to a first threshold value, and determine a frame where the first characteristic value is less than the first threshold value as a candidate frame of a second frame. The second frame may be a reference frame, and a plurality of candidate frames of the second frame may exist.

According to example embodiments, the processing unit 420 may determine, as the second frame, a frame which may provide the greatest amount of color information of a right area of an area corresponding to the first block from among the candidate frames of the second frame. In this instance, when other conditions are the same, a frame having a smaller SSD may be determined as the second frame. In this instance, the SSD may be an SSD between predetermined areas of the first frame and the second frame.

According to example embodiments, when a regular repetition is shown in color information of the background area of the first frame according to a characteristic of a texture, the processing unit 420 may generate color information of at least a portion of the disocclusion region of the first frame.

According to example embodiments, the image processing apparatus 400 may further include a rendering unit 430. The rendering unit 430 may be provided with color information and depth information associated with the first frame, and color information of the disocclusion region of the first frame, and thereby may provide a multi-view color image through a multi-view screen 130.

Figure 5:
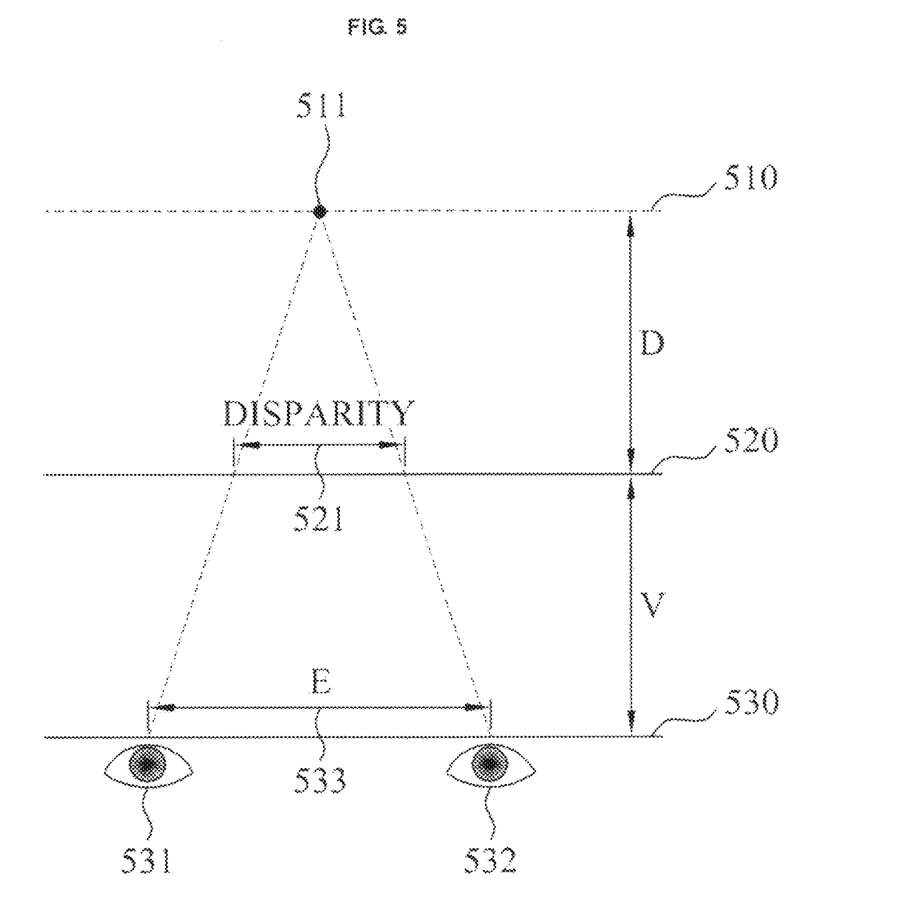
FIG. 5 illustrates a method of obtaining a disparity of a first frame, for example, the first frame of FIG. 1.

FIG. 5 illustrates a method of obtaining a disparity of a first frame, for example the first frame 110 of FIG. 1.

A disparity 521, represented in Equation 1 below as d, may indicate a difference of locations where a point 511 is projected to a screen 520 when a left eye 531 and a right eye 532 look at the point 511. Since a distance, E, 533 between the left eye 531 and the right eye 532 is limited, the disparity 521 may increase, as a distance D between the screen 520 and the line 510 containing the point 511 is greater than a distance V between the screen 520 and a line 530 containing the point locations of the left eye 531 and the right eye 532. That is, as an object is far from the left eye 531 and the right eye 532, the disparity 521 may decrease. Also, as the object is close to the left eye 531 and the right eye 532, the disparity 521 may increase. The disparity 521 may be calculated by, for example, Equation 1, shown below.

$$d = \frac{D \times E}{D + V} \qquad \text{Equation 1}$$

According to example embodiments, the calculation unit 410 (FIG. 4) may calculate a difference between a disparity of a background area and a disparity of an object area at the first viewpoint and a fifth viewpoint, in selecting for example, two of the multiple viewpoints illustrated in FIG. 1, and thereby may determine a disocclusion region in a left side of the object. In this instance, the first viewpoint may have a maximum viewing angle and the fifth viewpoint may be a viewpoint when k is nine. Also, the disparity of the object area may be relatively significant, and the disparity of the background area may be relatively insignificant.

Also, the calculation unit 410 (FIG. 4) may calculate a difference between a disparity of the background area and a disparity of the object area at the fifth viewpoint and a ninth viewpoint, in selecting for example, two of the multiple viewpoints illustrated in FIG. 1, and thereby may determine a disocclusion region in a right side of the object. In this instance, the fifth viewpoint and the ninth viewpoint may be viewpoints when k is nine.

According to example embodiments, and referring again to FIGS. 1, 2, and 4, the calculation unit 410 may receive the depth information 112 of the first frame 110. Also, the calculation unit 410 may determine a boundary between the object area 221 and the background area 222 based on a depth value and/or a disparity. In this instance, the depth value may be included in the depth information 112 and the disparity may be calculated at an arbitrary viewpoint. Also, the calculation unit 410 may determine disocclusion regions 211 and 212 of the first frame 110 around the boundary. In this instance, a plurality of boundaries may exist.

According to example embodiments, the calculation unit 410 may extract a vertical boundary from the boundaries. When the number of the extracted vertical boundaries is more than one, the calculation unit 410 may select a vertical boundary in a left half plane of the first frame 110. Then, the calculation unit 410 may determine a band to the right of the selected vertical boundary. The band may have a first width, and the region including the band may be determined as the left disocclusion region 211. Also, the calculation unit 410 may select a vertical boundary in a right half plane, and determine a band to the left of the selected vertical boundary. The band may have the first width and the region including the band may be determined as the right disocclusion region 212.

The first width may be calculated by, for example, Equation 2, shown below.

$$\text{First width} = \frac{D(\text{object}) \times \frac{k}{2} \times E}{D(\text{object}) + V} - \frac{D(\text{background}) \times \frac{k}{2} \times E}{D(\text{background}) + V} \quad \text{Equation 2}$$

Here, a first term of a right side may be the disparity of the object area calculated by Equation 1, and a second term of the right side may be the disparity of the background area calculated by Equation 1. In Equation 2, E may denote a distance between viewpoints neighboring to each other from among k viewpoints. In this instance, k may denote a number of multi-view viewpoints. The number of viewpoints k may be divided by two to obtain a difference between a disparity between a viewpoint having a maximum viewing angle and a viewpoint having a minimum viewing angle.

According to example embodiments, although the band with the first width may be determined as the disocclusion region of the first frame 110 around a selected boundary, the image processing apparatus and method may not be limited to the described example embodiments. Although complexity of computation may increase, a disocclusion region may be adaptively determined in each area.

Figure 6:
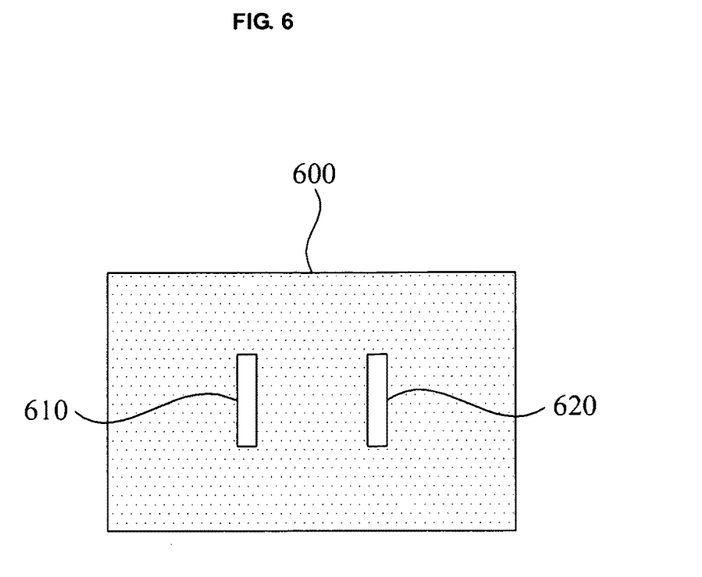
FIG. 6 illustrates disocclusion regions of a first frame, for example, the first frame of FIG. 2.

FIG. 6 illustrates disocclusion regions of a first frame, for example, the first frame of FIG. 2.

A calculation unit 410 (FIG. 4) may determine a left disocclusion region 610 and a right disocclusion region 620 in a first frame 600.

According to example embodiments, color information of the left disocclusion region 610 and the right disocclusion region 620 may be separately or simultaneously generated by a processing unit 420 (FIG. 4). Specifically, when n disocclusion regions exist, the processing unit 420 (FIG. 4) may separately generate the color information of each of the left disocclusion region 610 and the right disocclusion region 620, or simultaneously generate the color information of a portion or all disocclusion regions.

Figure 7:
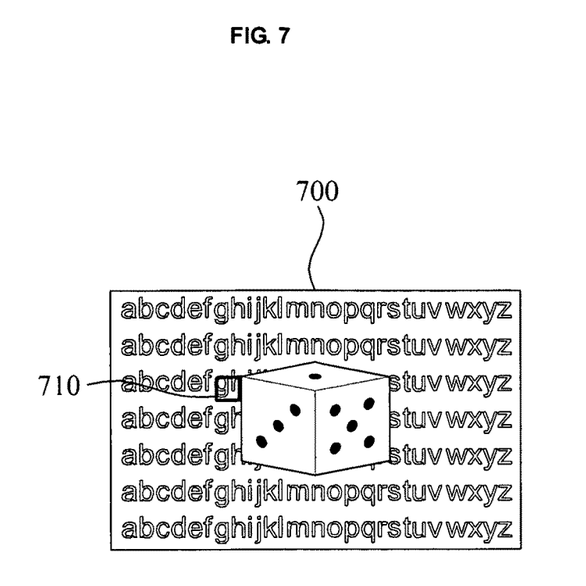
FIG. 7 illustrates a first block to generate color information of a disocclusion region, for example, the disocclusion region of FIG. 6.

FIG. 7 illustrates a first block to generate color information of a disocclusion region, for example, the disocclusion region 610 of FIG. 6.

According to example embodiments, the processing unit 420 (FIG. 4) may receive information about the disocclusion region 610 of FIG. 6. Also, the processing unit 420 (FIG. 4) may determine a first block 710 around the disocclusion region 610 (FIG. 6). The first block 710 may be used to retrieve a reference frame to generate the color information of the disocclusion region 610 (FIG. 6).

The processing unit 420 (FIG. 4) may receive color information associated with a plurality of frames such as an i-nth frame, i-(n+1)$^{th}$ frame, . . . , i–1$^{th}$ frame, i$^{th}$ frame, i+1$^{th}$ frame, . . . , i+n$^{th}$ frame. Also, the processing unit 420 (FIG. 4) may retrieve an area corresponding to the first block 710 in each of the plurality of frames. In this instance, the area may be matched with the first block 710 due to similar color values.

According to example embodiments, the processing unit 420 (FIG. 4) may calculate a first characteristic value. The first characteristic value may be an SSD, and be calculated based on a color value of a predetermined block. As an SSD between predetermined areas of two frames decreases, the areas may approach a same color value.

Also, the processing unit 420 (FIG. 4) may compare the first characteristic value of each of the plurality of frames to a first threshold value, and determine a frame where the first characteristic value is less than the first threshold value as a candidate frame of a second frame. The second frame may be a reference frame, and a plurality of candidate frames of the second frame may exist.

According to example embodiments, the processing unit 420 (FIG. 4) may generate color information of the disocclusion region based on a color value of a right area of an area corresponding to the first block from among the candidate frames of the second frame. However, the color information of the disocclusion region may be generated from color information of an area corresponding to a background area by referring to depth information of each of the plurality of frames. In this instance, the depth information of each of the plurality of frames may be provided to the processing unit 420 (FIG. 4), and the processing unit 420 may use the depth information. Also, depth values of the first frame and each of the candidate frames of the second frame may be compared, and color information of only an area where a depth value is equal to or less than a second threshold value may be used to generate the color information of the disocclusion region.

Accordingly, when a location of an object may change depending on a frame, the disocclusion region may be completely shown, and thus a frame having color information of the disocclusion region may be determined as the second frame. That is, the processing unit 420 (FIG. 4) may determine, as the second frame, a frame which may provide the greatest amount of color information of a right area of the area corresponding to the first block from among the candidate frames of the second frame. In this instance, when other conditions are the same, a frame having a smaller SSD may be determined as the second frame. In this instance, the SSD may be an SSD between predetermined areas of the first frame and the second frame.

According to example embodiments, when a regular repetition is shown in color information of a background area of a first frame 700 according to a characteristic of a texture, the processing unit 420 (FIG. 4) may generate color information of a disocclusion region from the first frame 700.

Although a first block 710 is illustrated as an example in FIG. 7, embodiments may not be limited to the described example embodiments. That is, it would be appreciated by those skilled in the related art that changes may be made to these example embodiments. For example, a size and location of the first block 710 next to a disocclusion region in the first frame 700 may be adapted depending on a frame, required quality, characteristics of a video, and the like.

Figure 8:
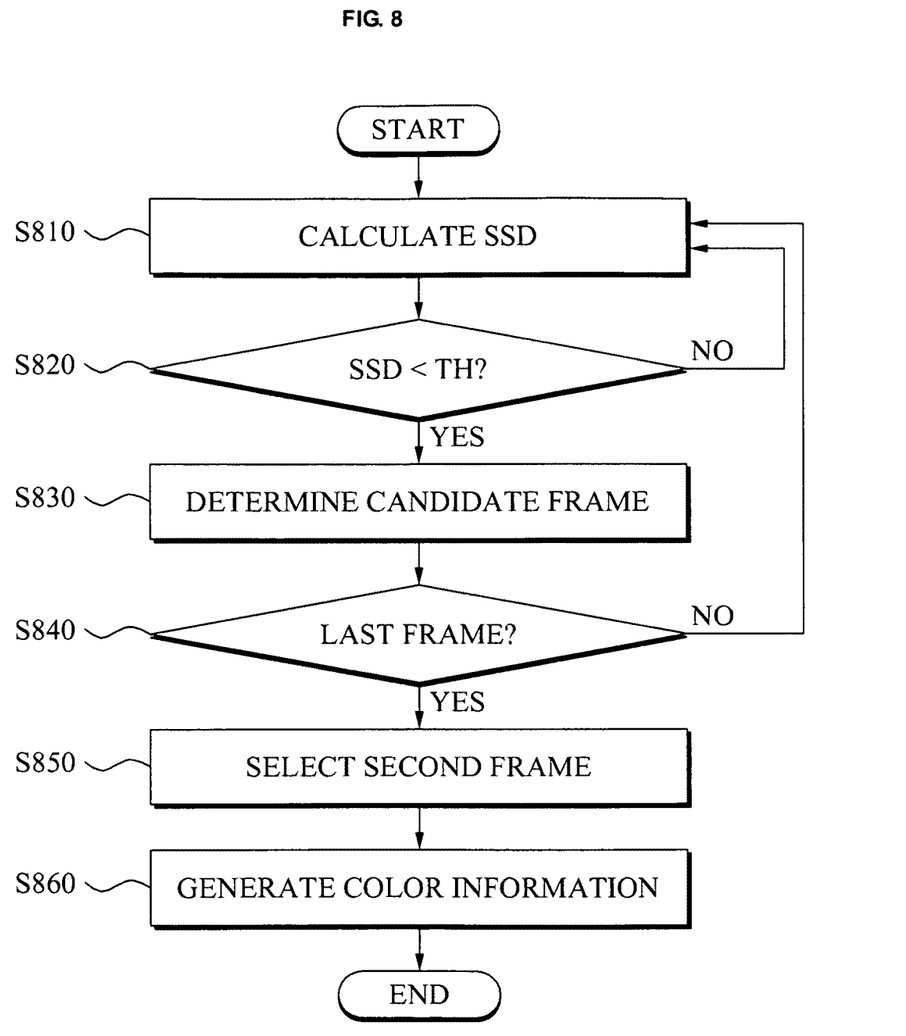
FIG. 8 illustrates a method of generating color information of a disocclusion region of a first frame in a processing unit, for example, the processing unit of FIG. 4.

FIG. 8 illustrates a method of generating color information of a disocclusion region of a first frame in a processing unit, for example, the processing unit 420 of FIG. 4.

The method of generating color information of a disocclusion region of a first frame may be embodied by the processing unit 420 of FIG. 4.

In operation S810, the processing unit 420 (FIG. 4) may determine a first block around the disocclusion region based on information about the disocclusion region. In this instance, the first block may be the first block 710 of FIG. 7 and the disocclusion region may be the disocclusion region 610 of FIG. 6. Also, the processing unit 420 may calculate a first characteristic value. For example, the first characteristic value may be an SSD between the first frame and a $j^{th}$ frame. In this instance, j may be a natural number. As the SSD between predetermined areas of the first frame and the $j^{th}$ frame decreases, the first frame and the $j^{th}$ frame may have a same color value.

In operation S820, the processing unit 420 (FIG. 4) may compare a predetermined first threshold value, Th, to the first characteristic value of each of a plurality of frames. When the first characteristic value is greater than the first threshold value, the processing unit 420 (FIG. 4) may ignore the $j^{th}$ frame, and return to operation S810 with respect to a subsequent frame.

If the first characteristic value is less than the first threshold value, then the method proceeds to operation S830, where the processing unit 420 (FIG. 4) may determine the $j^{th}$ frame as a candidate frame of a second frame. In this instance, a plurality of candidate frames may exist.

In operation S840, the processing unit 420 (FIG. 4) may determine whether the $j^{th}$ frame is a last frame to check. When the $j^{th}$ frame is not the last frame, the processing unit 420 (FIG. 4) returns to operation S810, and may perform the determining in operation S810, the comparing in operation S820, and the determining in operation S830 again.

If the $j^{th}$ frame is the last frame, then the method proceeds to operation S850, where the processing unit 420 (FIG. 4) may select the second frame from the candidate frames of the second frame. In operation S860, the processing unit 420 (FIG. 4) may generate color information of a disocclusion region of the first frame. The selecting in operation S850 and the generating in operation S860 has been described above with reference to FIG. 7.

According to example embodiments, the disocclusion region of the first frame may be divided into a plurality of disocclusion regions and color information of any one of the plurality of the disocclusion regions may be generated in operation S810 through operation S860. When the method is performed with respect to all the disocclusion regions, color information of the entire disocclusion region may be generated.

According to example embodiments, when the color information of the entire disocclusion regions of the first frame is not generated in operation S810 through operation S860, color information may be completely generated through extrapolation.

Figure 9:
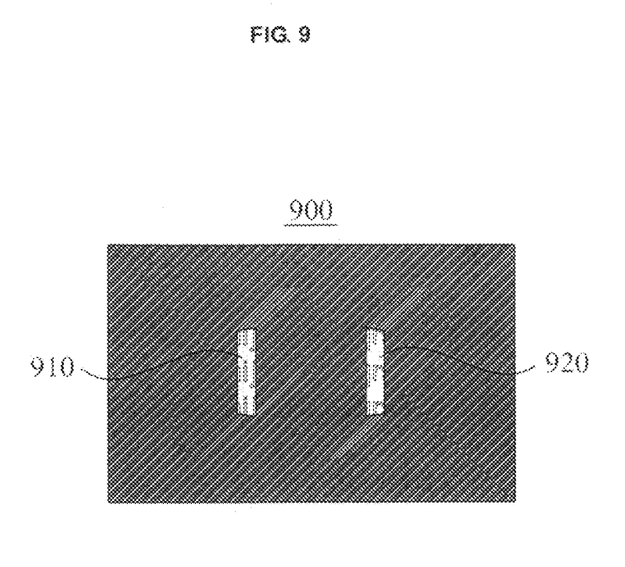
FIG. 9 illustrates color information of disocclusion regions of a first frame according to example embodiments.

FIG. 9 illustrates color information of disocclusion regions 910 and 920 of a first frame 900 according to example embodiments.

The color information of the disocclusion region 910 in the first frame 900 may correspond to color information of the left disocclusion region 610 of FIG. 6. Also, the color information of the disocclusion region 920 may be color information of the right disocclusion region 620.

Figure 10:
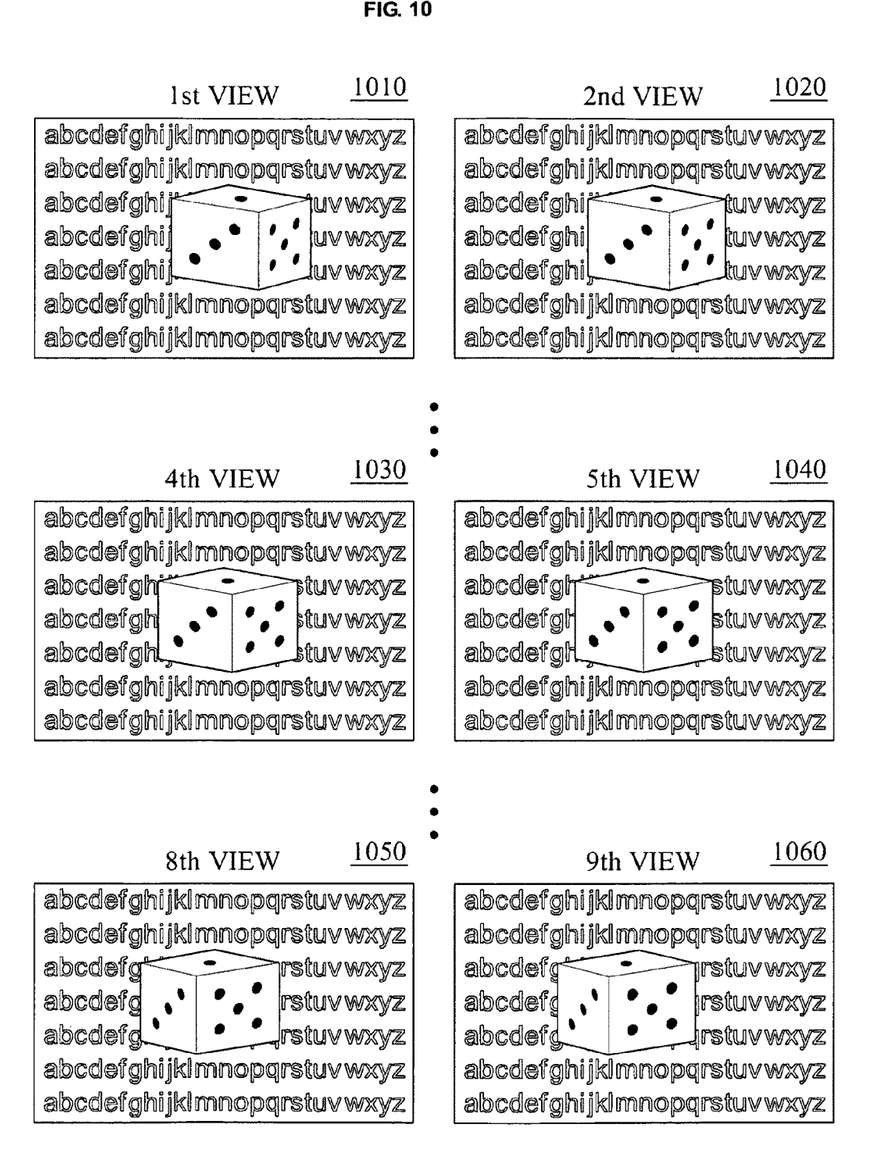
FIG. 10 illustrates multi-view images provided by an image processing apparatus according to example embodiments.

FIG. 10 illustrates multi-view images provided by an image processing apparatus according to example embodiments.

Referring to FIGS. 1, 4, 9 and 10, the color information 910 and 920, generated by the processing unit 410, as well as the color information 111 and the depth information 112 may be provided to the rendering unit 120. In this instance, the color information 111 and the depth information 112 may be associated with the first frame 110 of FIG. 1. Also, as an example, when k is nine, the rendering unit 120 may provide images 1010, 1020, 1030, 1040, 1050, and 1060 at nine viewpoints through the multi-view screen 130.

The images 1010, 1020, 1030, 1040, 1050, and 1060 may correspond to the images 310, 320, 330, 340, 350, and 360 of FIG. 3, respectively. When comparing each of the images 1010, 1020, 1030, 1040, 1050, and 1060, to each of the images 310, 320, 330, 340, 350, and 360, it may be ascertained that the disocclusion regions 311, 321, 331, 351, and 361 are improved.

The image processing method according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, etc. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, it would be appreciated by those skilled in the art that changes may be made to these example embodiments without departing from the principles and spirit of the disclosure, the scope of which is defined by the claims and their equivalents.

What is claimed is:

1. An image processing apparatus, comprising:
   at least one processing device;
   a calculation unit to determine a disocclusion region of a first frame of a video by using the at least one processing device; and
   a processing unit to generate color information of the disocclusion region of the first frame using color information associated with a second frame of the video,
   wherein the processing unit determines a first block of pixels around the disocclusion region of the first frame, determines a first characteristic value of an area corresponding to the first block within at least one frame of the video, and determines the second frame based on the first characteristic value, and
   the disocclusion region comprises a plurality of pixels.

2. The image processing apparatus of claim 1, wherein the calculation unit determines the disocclusion region of the first frame based on a difference between a disparity of a background area of the first frame and a disparity of an object area of the first frame, the disparities being calculated using depth information associated with the first frame.

3. The image processing apparatus of claim 2, wherein the calculation unit determines a boundary between the object area and the background area of the first frame, and determines a band with a first width around the boundary as the disocclusion region of the first frame, the first width being in proportion to the difference between the disparity of the background area of the first frame and the disparity of the object area of the first frame.

4. The image processing apparatus of claim 2, wherein at least one of the disparity of the background area of the first frame and the disparity of the object area of the first frame is calculated between a viewpoint having a maximum viewing angle and a viewpoint having a minimum viewing angle from among a plurality of viewpoints associated with a multi-view image to be rendered based on the first frame.

5. The image processing apparatus of claim 1, wherein the processing unit determines, as candidate frames of the second frame, a frame where a first characteristic value is less than a first threshold value from among the at least one frame of the video, generates color information of the disocclusion region around the first block with respect to the candidate frames of the second frame, and determines a frame which generates a greatest amount of color information of the disocclusion region around the first block, as the second frame.

6. The image processing apparatus of claim 5, wherein the processing unit compares the first characteristic value of each of the candidate frames of the second frame to determine the second frame.

7. The image processing apparatus of claim 5, wherein the processing unit obtains color information associated with pixels having a depth value difference with pixels of the background area of the first frame from among pixels around the area corresponding to the first block within the candidate frames of the second frame, determines the color information of the disocclusion region around the first block, and determines the frame which generates the greatest amount of color information of the disocclusion region around the first block, as the second frame, the depth value difference being less than a second threshold value.

8. The image processing apparatus of claim 1, wherein the processing unit copies color information of an area around the area corresponding to the first block within the second frame to generate the color information of the disocclusion region of the first frame.

9. The image processing apparatus of claim 8, wherein the processing unit copies the color information of the area around the area corresponding to the first block within the second frame, changes a location of the first block in the first frame, and copies color information of an area around an area corresponding to the changed first block within the second frame to generate the color information of the disocclusion region of the first frame.

10. The image processing apparatus of claim 1, further comprising:
    a rendering unit to render a multi-view image based on color information associated with the first frame, depth information associated with the first frame, and the color information of the disocclusion region of the first frame.

11. An image processing apparatus, comprising:
    at least one processing device;
    a calculation unit to determine a disocclusion region of a first frame of a video, by using the at least one processing device; and
    a processing unit to generate color information of the disocclusion region of the first frame using any one of color information associated with a second frame of the video and color information associated with the first frame of the video,
    wherein the processing unit determines a first block of pixels around the disocclusion region of the first frame, determines a first characteristic value of an area corresponding to the first block within at least one frame of the video, and determines the second frame based on the first characteristic value, and
    the disocclusion region comprises a plurality of pixels.

12. The image processing apparatus of claim 11, wherein the calculation unit determines the disocclusion region of the first frame based on a difference between a disparity of a background area of the first frame and a disparity of an object area of the first frame, the disparities being calculated using depth information associated with the first frame.

13. The image processing apparatus of claim 11, wherein the processing unit determines a second block having similar color information as the first block within the first frame, and when the second block in the first frame is determined to be more appropriate than an area corresponding to the first block in the second frame based on a first characteristic value and an amount of the disocclusion region of the first frame having been restored, the processing unit restores the disocclusion region of the first frame using the second block and color information associated with the first block.

14. An image processing method, comprising:
    determining a disocclusion region of a first frame of a video; and
    generating color information of the disocclusion region of the first frame using color information associated with a second frame of the video,
    wherein the generating determines a first block of pixels around the disocclusion region of the first frame, determines a first characteristic value of an area corresponding to the first block within at least one frame of the video, and determines the second frame based on the first characteristic value, and
    the disocclusion region comprises a plurality of pixels.

15. The image processing method of claim 14, wherein the determining determines the disocclusion region of the first frame based on a difference between a disparity of a background area of the first frame and a disparity of an object area of the first frame, the disparities being calculated using depth information associated with the first frame.

16. A non-transitory computer-readable recording medium having stored thereon instructions for implementing an image processing method, the instructions comprising:
   determining a disocclusion region of a first frame of a video, the disocclusion region of the first frame being determined based on a difference between a disparity of a background area of the first frame and a disparity of an object area of the first frame, the disparities being calculated using depth information associated with the first frame; and
   generating color information of the disocclusion region of the first frame using color information associated with a second frame of the video,
   wherein the generating determines a first block of pixels around the disocclusion region of the first frame, determines a first characteristic value of an area corresponding to the first block within at least one frame of the video, and determines the second frame based on the first characteristic value, and
   the disocclusion region comprises a plurality of pixels.

17. The image processing apparatus of claim 1, wherein the first characteristic value is a sum of squared difference (SSD) which is calculated based on the color value of a predetermined block.

18. The image processing method of claim 14, wherein the first characteristic value is a sum of squared difference (SSD) which is calculated based on the color value of a predetermined block.

* * * * *